(12) United States Patent
Finkelstein

(10) Patent No.: US 9,219,654 B2
(45) Date of Patent: Dec. 22, 2015

(54) PRELOADING TOKEN BUCKETS FOR DYNAMICALLY IMPLEMENTING SPEED INCREASES

(75) Inventor: Jeff Finkelstein, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 897 days.

(21) Appl. No.: 12/823,130

(22) Filed: Jun. 25, 2010

(65) Prior Publication Data
US 2011/0320631 A1    Dec. 29, 2011

(51) Int. Cl.
*H04L 12/24* (2006.01)
*H04L 12/801* (2013.01)
*H04L 12/819* (2013.01)
*H04L 12/815* (2013.01)

(52) U.S. Cl.
CPC .......... *H04L 41/0896* (2013.01); *H04L 47/10* (2013.01); *H04L 47/215* (2013.01); *H04L 47/22* (2013.01)

(58) Field of Classification Search
USPC ................................................. 709/232, 223
See application file for complete search history.

(56) References Cited

U.S. PATENT DOCUMENTS

| | | | |
|---|---|---|---|
| 6,970,426 B1* | 11/2005 | Haddock | 370/235.1 |
| 2005/0073997 A1* | 4/2005 | Riley et al. | 370/352 |
| 2005/0083845 A1* | 4/2005 | Compton et al. | 370/235 |
| 2010/0214925 A1* | 8/2010 | Gormley | 370/235.1 |

* cited by examiner

*Primary Examiner* — Angela Nguyen
(74) *Attorney, Agent, or Firm* — Merchant & Gould

(57) ABSTRACT

Providing a dynamic bandwidth increase using at least one token bucket is disclosed. At least one token bucket is preloaded to capacity using PCMM commands to dynamically implement speed increases in the network. By pre-loading the at least one token bucket to capacity, the rate cap assigned to the customer is overridden. When the token bucket is exhausted the customer continues at their provisioned rate cap. Only a configuration file has to be changed to implement the temporary bandwidth increase. The token buckets may be implemented on a per service flow basis. Further, a plurality of token buckets may be provided, wherein a first token bucket is configured to control a total burst size and a second token bucket is configured to control an individual flow burst rate up until the first token bucket is depleted.

24 Claims, 13 Drawing Sheets

PRELOADING TOKEN BUCKETS FOR DYNAMICALLY IMPLEMENTING SPEED INCREASES

FIELD OF THE INVENTION

This disclosure relates in general to bandwidth control in a communications network, and more particularly to preloading token buckets for dynamically implementing speed increases in the network.

BACKGROUND

On the Internet, many paths may exist between a given pair of nodes. The total message-carrying capacity (bandwidth) between two given nodes is the maximum amount of data per unit time that can be transmitted from one node to the other. Using a technique called packet switching, this data can be transmitted along several paths at the same time.

Service providers may provide their subscribers with various services including multimedia services by which subscribers obtain television and other multimedia content for viewing, data services such as Internet access, and telephony services including local, long distance, and/or video conferencing telephone services. In a bundled scenario, a provider may deliver two or more of these services to subscribers over an access network physical layer that is common to the bundled services.

However, applications and services continue to be developed to drive consumers demand for increases in Internet bandwidth. For example, the escalating popularity of social networking sites and the emergence of high-bandwidth applications, such as voice and video, act to increase consumer demand. Video downloads and transmissions are the most bandwidth intensive, wherein a video download may consume 8 to 10 times the bandwidth required for voice or music.

Further, products are increasingly becoming available to allow consumers to link their broadband audio, video, and data downloads to electronic devices and gadgets throughout their home. In a networked home, cable modems, digital video recorders (DVR), voice over IP (VoIP) systems, personal computers, and TVs are all linked. As each of the latest digital entertainment services come on line, the need for bandwidth further increases.

To fully take advantage of the new capabilities, consumers must upgrade to higher tiered services and packages. However, most customers have difficulty in concretely identifying rates of data throughput. Further, the demand for higher bandwidth is transitory. Often the need for higher bandwidth is related to a particular download.

Accordingly, there is a need for dynamically adjusting bandwidth for subscribers to accommodate individual needs.

SUMMARY OF THE INVENTION

To overcome the limitations described above, and to overcome other limitations that will become apparent upon reading and understanding the present specification, embodiments for preloading at least one token bucket for dynamically implementing speed increases in the network are disclosed.

The above-described problems are solved by overriding the rate cap as assigned to the customer by preloading at least one token bucket of a customer to capacity, thereby allowing the customer to burst for a short time at line rate. When the at least one token bucket is exhausted the customer continues at their provisioned rate cap.

An embodiment includes a policy manager that provides memory for storing data and a processor, coupled to the memory, the processor configured to implement at least one token bucket having parameters for controlling the amount of data injected into a network, the processor receiving and processing packet cable multimedia commands to dynamically configure the parameters of the at least one token bucket to provide a temporary bandwidth increase, the temporary bandwidth increase provided by preloading the at least one token bucket to capacity.

In another embodiment, a network for providing a dynamic bandwidth increase using at least one token bucket is disclosed. The network includes a policy manager configured storing data and for implementing at least one token bucket having parameters for controlling the amount of data injected into a network, the policy manager including a processor for receiving and processing packet cable multimedia commands to dynamically configure the parameters of the at least one token bucket to provide a temporary bandwidth increase, the policy manager generating a bandwidth setting command requesting a temporary bandwidth increase by preloading the at least one token bucket to capacity and a cable modem termination system, coupled to the policy manager, for receiving the bandwidth setting command from the policy manager, the cable modem termination system establishing an increased bandwidth for a subscriber based on the receipt of the bandwidth setting command from the policy manager.

In another embodiment, a method for providing a dynamic bandwidth increase using at least one token bucket is disclosed. The method includes storing configuration data file, receiving and processing a packet cable multimedia command for modifying the configuration data file, dynamically configuring parameters of at least one token bucket to provide a temporary bandwidth increase based on the packet cable multimedia command and preloading the at least one token bucket to capacity in response to the dynamically configuring the parameters of the at least one token bucket.

A computer readable medium including executable instructions which, when executed by a processor, provides a dynamic bandwidth increase using at least one token bucket, is disclosed. The computer readable medium includes instructions executable by the processor to store configuration data file, receive and processing a packet cable multimedia command for modifying the configuration data file, dynamically configuring parameters of at least one token bucket to provide a temporary bandwidth increase based on the packet cable multimedia command and preloading the at least one token bucket to capacity in response to the dynamically configuring the parameters of the at least one token bucket.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to preloading token buckets for dynamically implementing speed increases in the network. By overriding the rate cap assigned to the customer by preloading the customer's token bucket to capacity, the subscriber is allowed to burst for a short time at line rate. When the token bucket is exhausted the customer continues at their provisioned rate cap.

Figure 1:
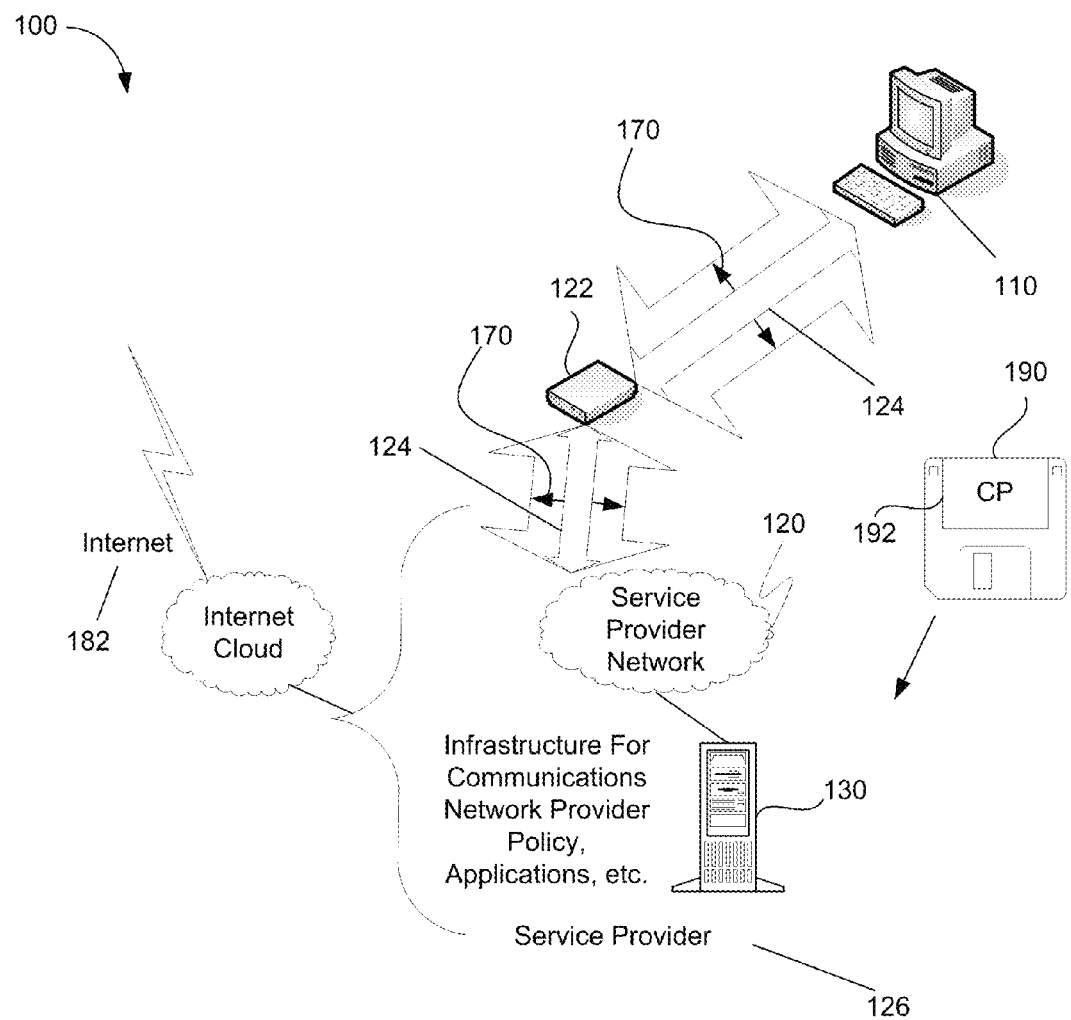
FIG. 1 is a block diagram of a system providing increased bandwidth according to an embodiment of the invention.

FIG. 1 is a block diagram of a system 100 providing in-network online storage with increased session bandwidth according to an embodiment of the invention. In FIG. 1, a subscriber 110 is coupled to a communications network provider 120, such as a cable operator, through an interface device 122, such as a router or cable modem. Most operations performed by the user are performed employing a first predetermined bandwidth 124. For example, the first predetermined bandwidth 124 may be used for browsing the Internet, VoIP calls, content download and other typical online activity. Policy servers 130 may be used to control the amount of bandwidth that is allocated to the subscriber by the communications network provider 120.

The communications network provider 120 provides and maintains their own network for providing content and/or data to subscribers 110. The communications network provider 120 may provide cable programming, movies-on-demand and other services/content over the network. The communications network provider 120 may also provide the subscriber 110 access to the Internet 182 via the network. When a subscriber needs an increase in bandwidth, a boost 170 in bandwidth may be provided by the communications network provider 120.

Embodiments may be implemented in a suitable computing environment. Embodiments may also be implemented in combination with other types of computer systems and program modules. Generally, program modules include routines, programs, components, data structures, and other types of structures that perform particular tasks or implement particular abstract data types. By way of example, computer readable media 190 can include computer storage media and communication media. Computer storage media 190 includes volatile and nonvolatile, removable and non-removable media implemented in any method or technology for storage of information 192, such as computer readable instructions, data structures, program modules or other data. Computer storage media 190 typically embodies computer readable instructions, data structures, program modules or, in some instances, other data in a modulated data signal such as a carrier wave or other transport mechanism. The term "modulated data signal" means a signal that has one or more of its characteristics set or changed in such a manner as to encode information in the signal. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located at the communications network provider 120.

Embodiments implemented on computer-readable media 190 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 190 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device.

As mentioned briefly above, a number of program modules and data files may be stored and arranged for controlling the operation of processing devices. Thus, processing devices, such as infrastructure 130 of the communications network provider 120 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Figure 2:
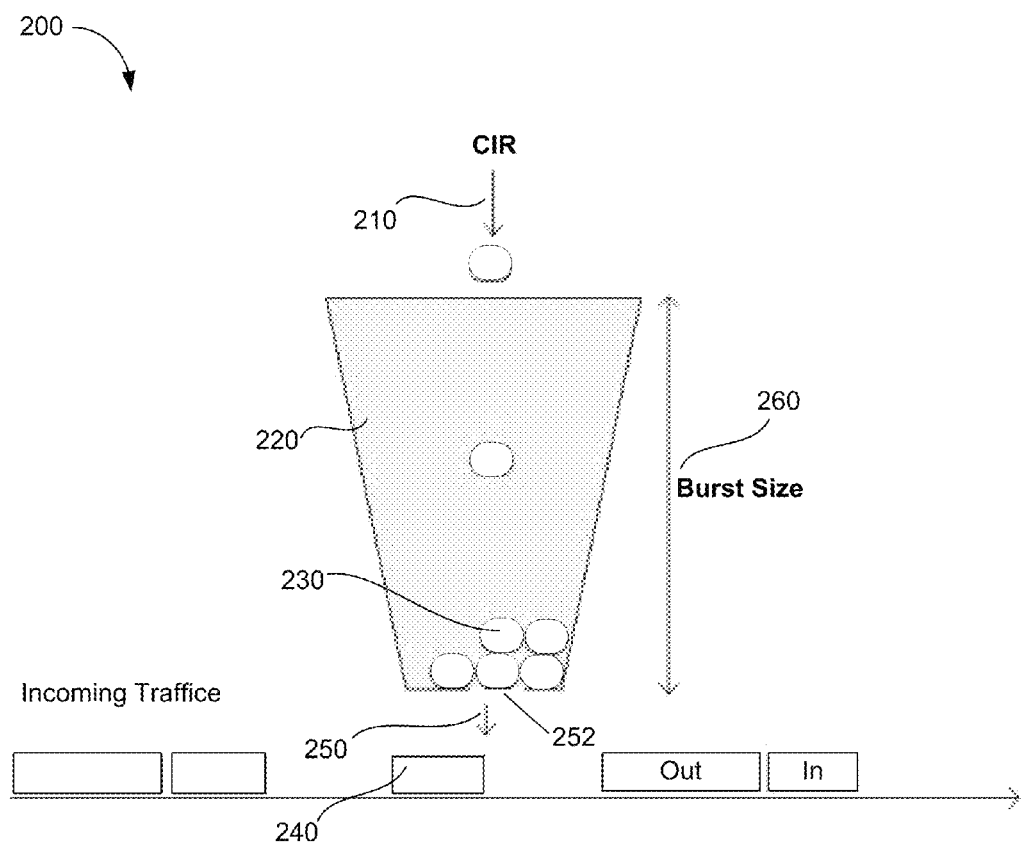
FIG. 2 shows the token bucket algorithm according to one embodiment of the invention.

FIG. 2 shows a token bucket algorithm 200 according to one embodiment of the invention. The token bucket algorithm 200 is used to control the amount of data that is injected into a network. A token bucket provides a mechanism by which bursty traffic can be shaped to present a steady stream of traffic to the network, as opposed to traffic with erratic bursts of low-volume and high-volume flows. With a single token bucket 220 per user, the token accumulation rate is often called Committed Information Rate (CIR) 210, to distinguish it from combined meters that have multiple buckets and token sources. The token bucket 220 contains tokens 230, each of which can represent a unit of bytes or a single packet of predetermined size.

Traffic can be transmitted, based on the presence of tokens in the bucket, which is merely an abstract container that holds aggregate network traffic to be transmitted. A token bucket algorithm relies upon a token accumulation rate and a burst tolerance. Thus, tokens 230 represent equivalents of traffic volume since traffic is transmitted based on the presence of tokens in the bucket.

The token bucket 220 stores tokens which are added to the bucket 220 at a constant pace until the bucket 220 has reached its burst size 260, meaning the bucket 220 is full. Tokens 230 are removed 250 when traffic 240 arrives. Packets that arrive to the meter at a moment when there are sufficient tokens in the bucket 220 corresponding to its size are declared 'Conforming' or 'In Profile'. Thus, when tokens are present, a flow is allowed to transmit traffic up to its peak burst rate if there are adequate tokens in the bucket 220 and if the burst threshold is configured appropriately.

To provide a different rate cap, the rate of token removal 250 is increased. This can be visualized as increasing an aperture hole 252 in the bottom of the token bucket 220. If the token bucket 220 has a bigger hole 252, and the bucket 220 has been prefilled, bits of data are going to be transmitted as quickly as tokens can fall through the hole 252, e.g., at line rate.

The token bucket 220 may be manipulated by dynamically enlarging the bucket 220 and/or dynamically making the hole 252 in the bottom of the bucket 220 larger. The level of service may therefore be set by simply making a change to the configuration file of a subscriber. Packet cable multimedia (PCMM) allows an external source to be used to manipulate the bucket 220, i.e., to make the change to the configuration file for the subscriber. So the size of the bucket 220 may be dynamically modified when there is available bandwidth.

When there is not sufficient bandwidth, the size of the bucket 220 may be reduced dynamically. The dynamic adjustment to allow a temporary speed increase may be initiated in response to a request for more bandwidth from a subscriber. This can be automatic, customer triggered, or the service provider may trigger the change on behalf of the subscriber. In addition, a third party, if authenticated, may be allowed to make the dynamic adjustment. Packet cable multimedia, allows the service provider to exert more control on how much bandwidth is used.

The dynamic adjustment to provide the speed boost allows customers to achieve speeds greater than their rate cap, although it does not require changes to existing hardware or software reducing the need for new equipment to achieve higher speeds. The speed boost dramatically changes the customers speed without rebooting the modem. The boost is created by overriding the rate cap as assigned to the customer by preloading the customer's token bucket 220 to capacity, thereby allowing them to burst for a short time at line rate. When the token bucket 220 is exhausted the customer continues at their provisioned rate cap.

Those skilled in the art will recognize that more than one token bucket may be implemented. In addition, token buckets 220 may be implemented on a per service flow basis. In a single token bucket case, the token bucket 220 is used to control the initial burst related to an individual flow. With multiple token buckets 220, the primary token bucket controls the total burst size, but secondary token buckets 220 may be used to control the individual burst sizes. For example, if a primary token bucket 220 is sized to 1 MB and secondary token buckets 220 are sized to 512 KB, each burst can be no more than 512 KB for 2 bursts, with a subsequent bursts being at line rate. Accordingly, the use of secondary token buckets 220 controls the individual burst rate up until the primary token bucket 220 is depleted.

Figure 3:
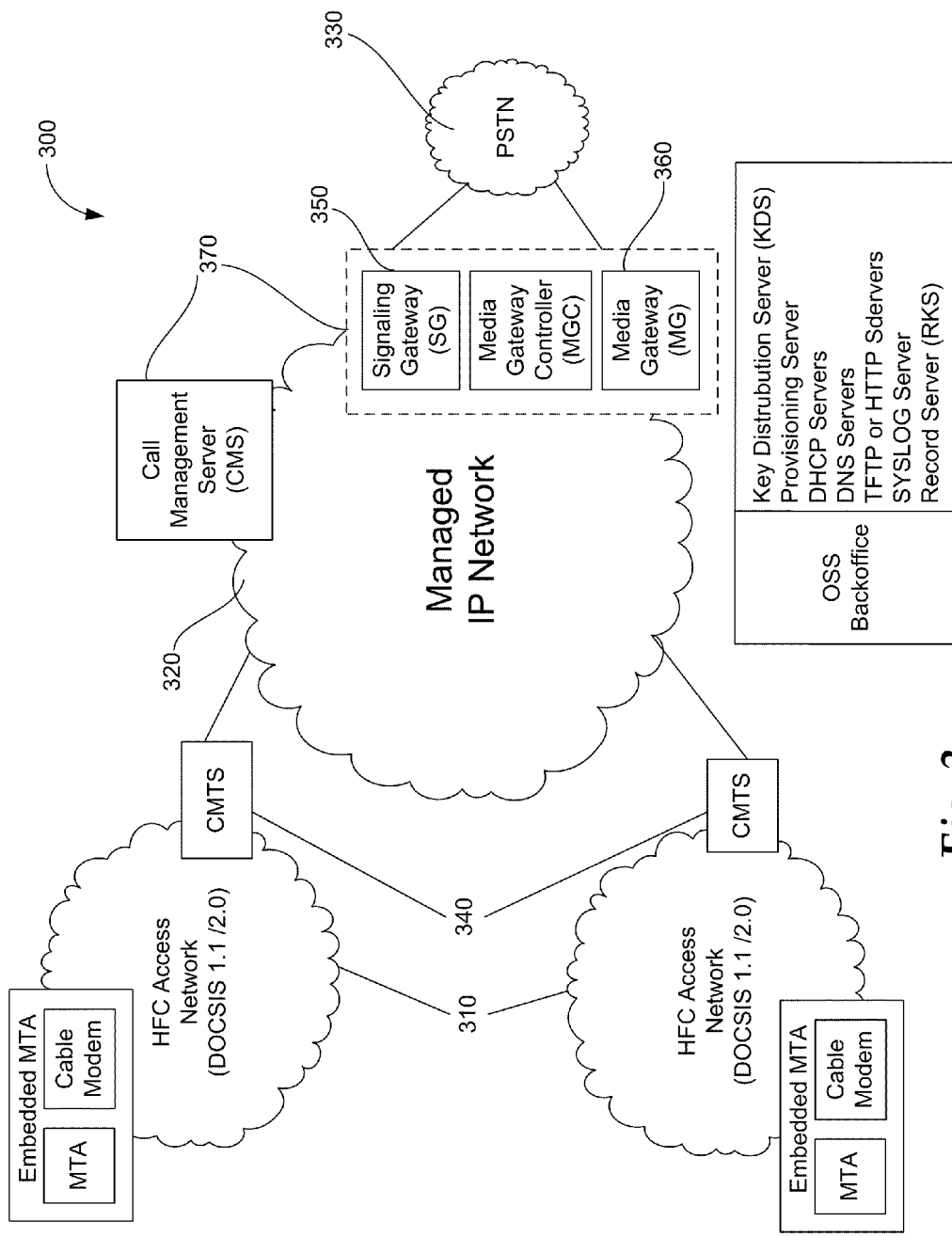
FIG. 3 is a block diagram of Packet Cable MultiMedia (PCMM) according to one embodiment.

FIG. 3 is a block diagram 300 of PacketCable MultiMedia (PCMM) according to one embodiment. The basic functions are provided on several general-purpose servers 370, which lead to a low-cost, highly flexible, scalable, distributed architecture. At a very high level, the PCMM architecture 300 may be associated with three networks: the DOCSIS® HFC Access Network 310, the Managed IP Network 320, and the PSTN 330. Thus, a server 370 according to PCMM enables the delivery of residential voice telephony over IP, commonly referred to as digital voice. The end-to-end architecture 300 shows a complete system that includes device provisioning, call signaling, event messaging (accounting), configuration management, QoS, PSTN interconnection, and security. These functions enable telecommunications companies to control provisioning of services to customers.

According to an embodiment, PCCM is used to provide speed increases that are greater than the rate cap of the customer. By overriding the rate cap assigned to the customer by preloading the customer's token bucket to capacity, the customer may experience a burst for a short time at line rate. When the token bucket is exhausted the customer returns to the provisioned rate cap. The Cable Modem Termination System (CMTS) 340 provides communication between the DOCSIS® HFC Access Network 310 and the Managed IP Network 320. Both the Signaling Gateway (SG) 350 and the Media Gateway (MG) 360 provide connectivity between the Managed IP Network 320 and the PSTN 330.

Figure 4:
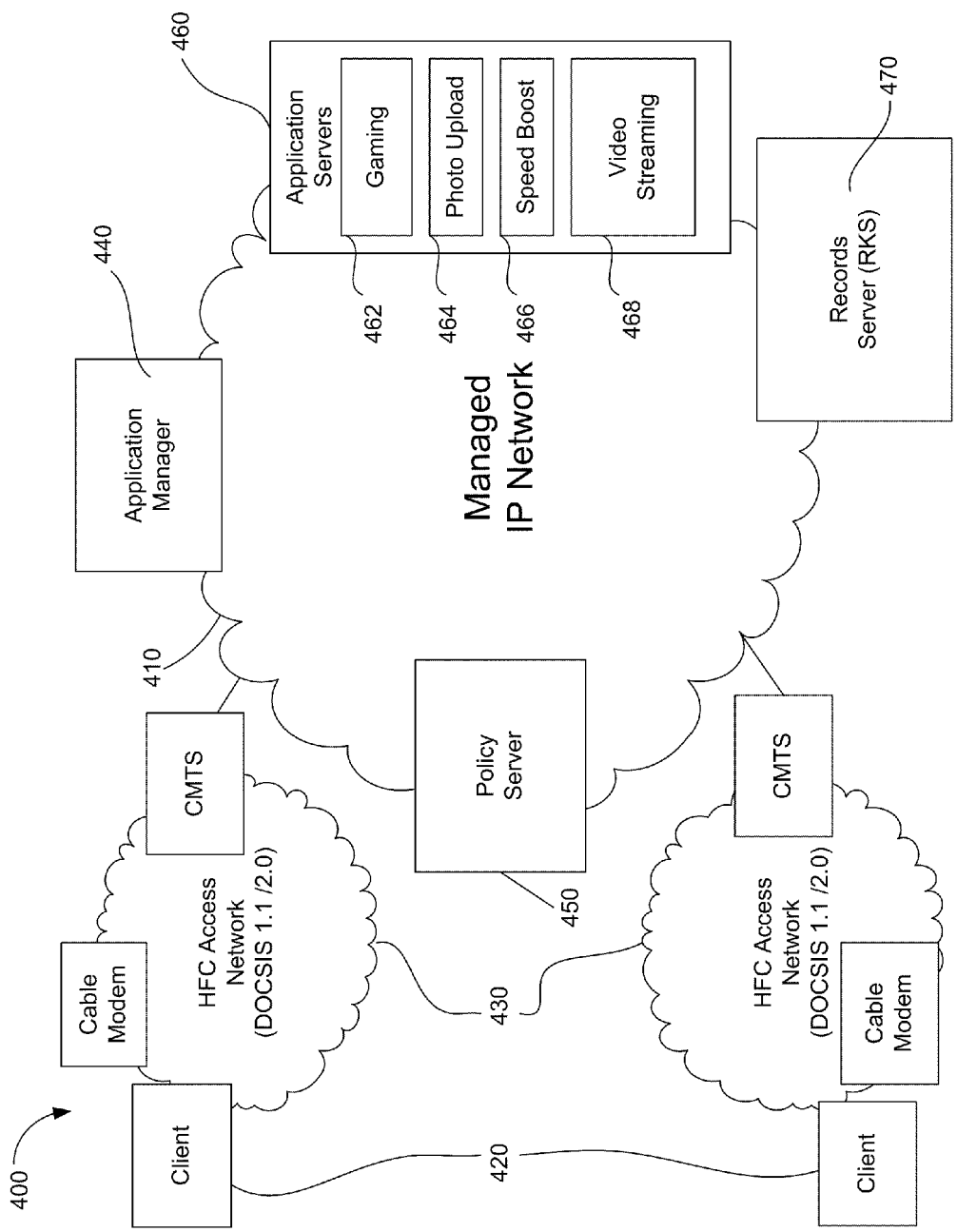
FIG. 4 is a block diagram showing PacketCable™ Multimedia network elements according to one embodiment.

FIG. 4 is a block diagram 400 showing PacketCable™ Multimedia network elements according to one embodiment. The PacketCable™ Multimedia specification defines an IP-based platform 410 for delivering QoS-enhanced multimedia services to the customer 420 over DOCSIS® access networks 430. The managed IP network 410 provides QoS authorization and admission control, event messages for billing and other back-office functions, and security to support a wide range of IP-based services beyond telephony. While the PacketCable™ architecture 400 may be configured to include provisioning of residential telephony services as shown in FIG. 3, the PacketCable™ Multimedia architecture 400 offers a general-purpose platform for cable operators to deliver a variety of IP-based multimedia services that require QoS management and control. The Application Manager 440 and Policy Server 450 authenticate subscribers and ensure that subscribers receive the required Quality of Service needed for any specific multimedia applications. Application Servers 460 host content and provide application services to Client devices 420.

Many applications require a large amount of bandwidth. For example, power gaming 462 via application servers 460 is one application that would benefit from a speed increase. Online gaming users expect a superior experience; thus, effectively managing latency and jitter for their gaming sessions is important. Once a subscriber is logged in to the service provider system via clients 420, the subscriber would be able to go to a specific gaming page or channel. From that page the subscriber would be able to select a specific game. Each game may be implemented with its own PCMM policy to ensure that the QoS policy only applies to that session and cannot be used for non-authorized applications.

Another example involves photo uploading applications 464. One of the problems with existing photo sharing sites is that it can take a very long time to upload anything more than just a few photos at a time. However, a better customer experience may be provided by using a higher upstream cap in order to quickly upload many photos at once. This particular scenario may require that subscriber at client 420 download a small application that communicates with the speed increase application manager 466. Subscriber logging in with primary account holder status may be provisioned with this PCMM upgrade. However, a configurable check may be implemented so that the service could be opened to non-primary users if so desired. Again, the service provider may control such access dynamically through PCMM 400.

For a subscriber to enjoy video streaming, video streaming application 468 may also utilize a temporary speed increase according to an embodiment of the invention. Video streaming application 468 may provide streaming content, such as HD quality movies, and because of the increasing size of such files an increase in bandwidth may be triggered to download a movie for viewing. Video streaming application 468 may implement a prioritized PCMM service flow that could even allow flawless delivery of HD content. The subscriber may be able to click on a link to view a movie trailer or other streaming content, the required authorization checks are performed and the required service flows are provisioned in the background. The streaming video content authorization checks may include only allowing customers logging in with a primary account holder status to be eligible for the PCMM upgrade, the customer must be associated with an account that also has access to the desired video content, and check the geographical location associated with the account to determine if constraints are applicable, e.g., a pay-per-view or premium sporting event broadcast.

The Record Keeping Server 470 is responsible for accepting event messages, incorporating partial billing information into a single coherent record that describes the resources used during the service, and passing this information on to the billing system.

Figure 5:
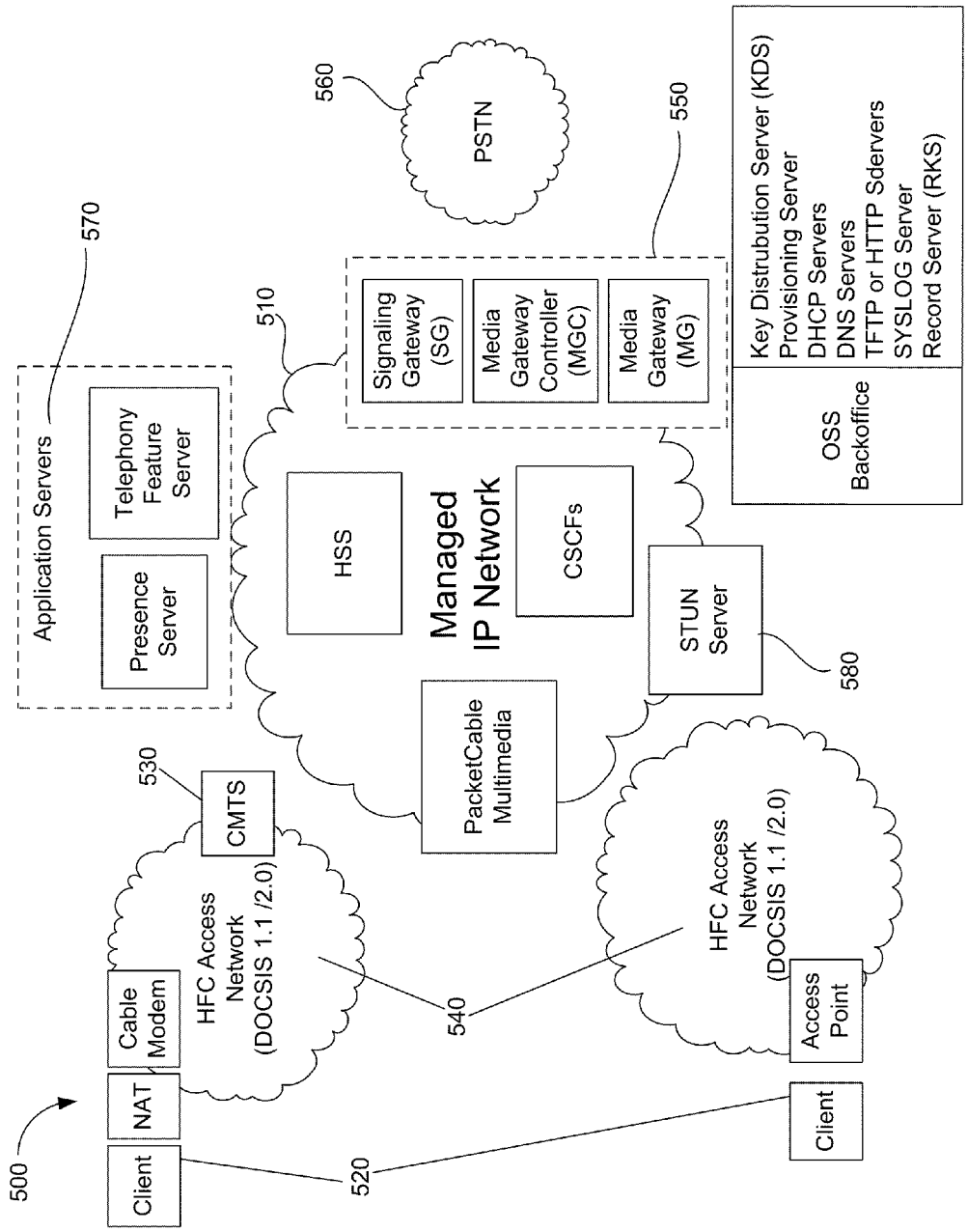
FIG. 5 is a block diagram illustrating another PacketCable™ architecture according to an embodiment of the invention.

FIG. 5 is a block diagram 500 illustrating another Packet-Cable™ architecture according to an embodiment of the invention. The architecture 500 in FIG. 5 is configured to extend cable's existing Internet Protocol service environment to accelerate the convergence of voice, video, data, and mobility technologies. The architecture 500 is an application-agnostic architecture that is based on a common network core 510. The network core 510 is a set of network elements that use standard protocols to register clients 520 in the network and to establish sessions. The Cable Modem Termination System (CMTS) 530 provides communication between the DOCSIS® HFC Access Network 540 and the Managed IP Network 510. Both the Signaling Gateway (SG) and the Media Gateway (MG) 550 provide communication between the Managed IP Network 510 and the PSTN 560. Applications servers 570 reside outside the core network for the delivery of enhanced residential and small/medium business digital voice services (including video telephony), and mobility services which also supports feature integration across service platforms according to an embodiment of the invention. The STUN Server 580 is required only when an SMA Gateway is behind a NAT device and needs to establish media sessions with other media clients that may or may not be behind NAT devices. The STUN server 580 determines one of several possible candidate media addresses using a predetermined protocol. A number of applications may utilize the PacketCable core network, such as residential SIP telephony, cellular integration, business services, and HD voice.

Figure 6:
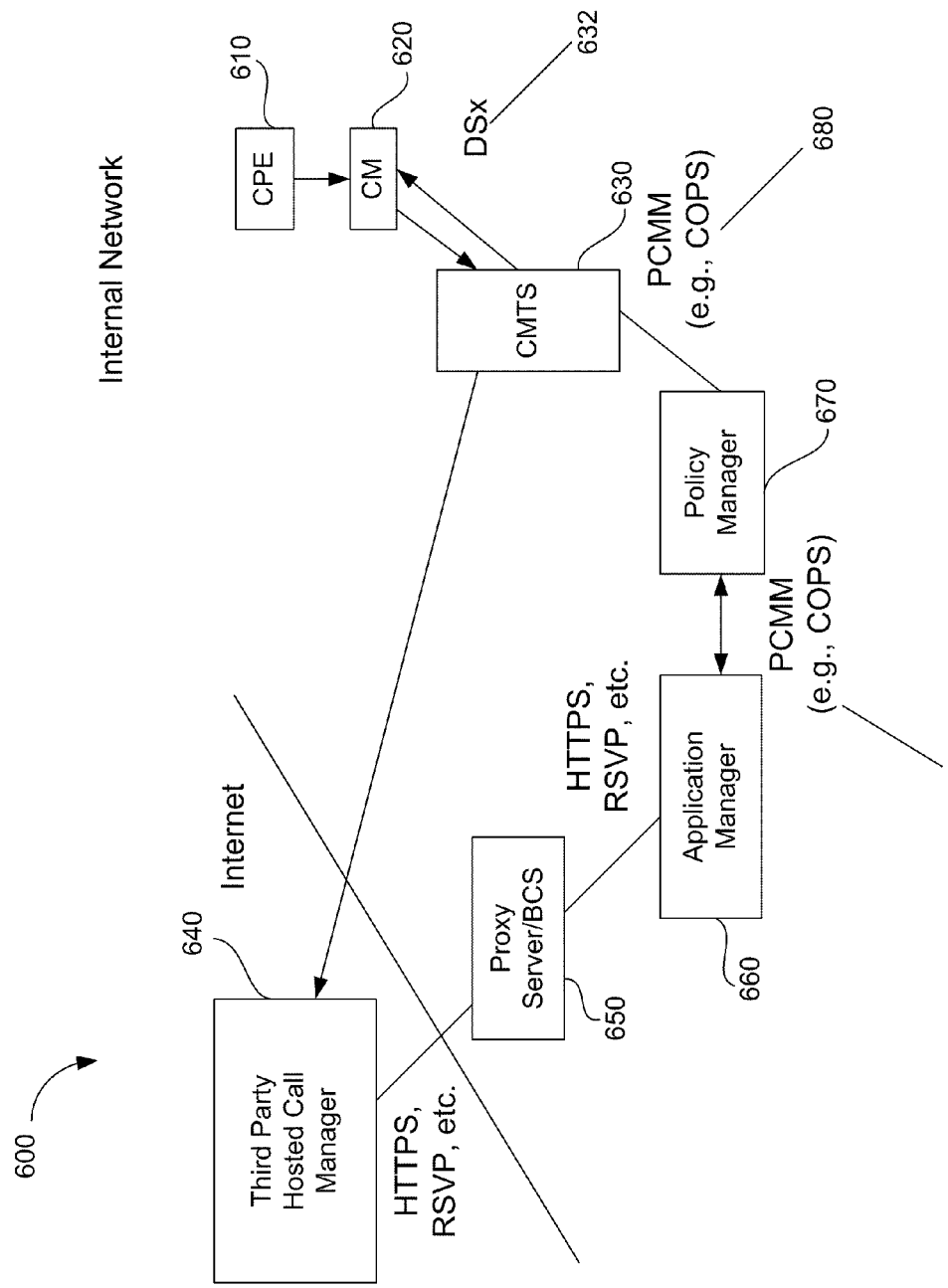
FIG. 6 shows a block diagram of a network that enables signaling for dynamic quality of Service (DQOS) according to one embodiment.

FIG. 6 shows a block diagram 600 of a network that enables signaling for dynamic quality of Service (DQOS) according to one embodiment. With the distribution of services that were traditionally maintained internal to the operators network, a secure mechanism is used for third party hosted services that communicate into the network to allow dynamic quality of service. The network 600 uses standard protocols to provide a dynamic quality of service (DQoS) to facilitate the third party's premium services to subscribers of the service provider. By authenticating the third party hosted services, the service provider is able to enter into business arrangements to share revenue with the third party content providers based on the premium service.

In FIG. 6, the CPE 610 issues a request through the cable modem 620 to a third party server. The CM 620 sends traffic to CMTS 630. The CMTS 630 forwards the customer's request to the Third Party Hosted Call Manager 640. The third party server 640 sends the DQoS request to the Edge Proxy Server 650. Communications from the external network server 640 to an internal network server 650 is performed using standard public key cryptography. HTTPS may be used for sending the request to the Edge Proxy Server 650. Alternatively, the Resource Reservation Protocol (RSVP) may be used in making a bandwidth request. The Edge Proxy Server 650 validates the request, and then sends the request to the Application Manager 660. HTTPS or RSVP may also be used for this communication.

The Application Manager 660 translates the request to PCMM 680 and sends the translated request to the Policy Manager 670. For example, the request may be transformed to a common open policy service (COPS) over TCP connection within the PCMM 680. COPS enables the management of policy-based admission control decisions and provides a means to distribute policies to different network devices. Policy Manager 670 enforces the policies across the network. Policy Manager 670 validates the request and determines the resources needed. Policy Manager 670 then sends a PCMM 680 gate set to CMTS 630. CMTS 630 determines resources availability, creates a PCMM gate and communicates with CM, for example using DSx messaging 632, to set up service flow with enhanced QoS. This may mean, for example, that an increase in bandwidth is provided to the subscriber for accessing the content of the validated third party. After the session is completed, it is closed. The Policy Manager 670 tears-down the communication path and signals the Edge Proxy Server 650 to shut down the connection. The Edge Proxy Server 650 then notifies the Third Party Application Server 640 that the session has completed. The session may be terminated based on receiving a close session notification from the third party, after a predetermined period of time elapses, and/or the number of allowed bytes has been met. The session is torn down and the customer is reset to the standard rate cap.

If the subscriber needs more bandwidth than is currently available, the Policy Manager 670 can move the subscriber to a different flow to provide more capacity to the customer by allowing the subscriber to receive speed boosts as described above with reference to FIGS. 1-2. Thus, dynamically providing QoS, rather than pre-provisioning the quality of service, allows the service provider to offer more types of service.

Accordingly, a service provider verifies the third party and opens up a secure exchange between the validated third party and the subscriber. The service provider only has to provide a signal internal to the network to the packet cable multimedia infrastructure to enable the request.

Figure 7:
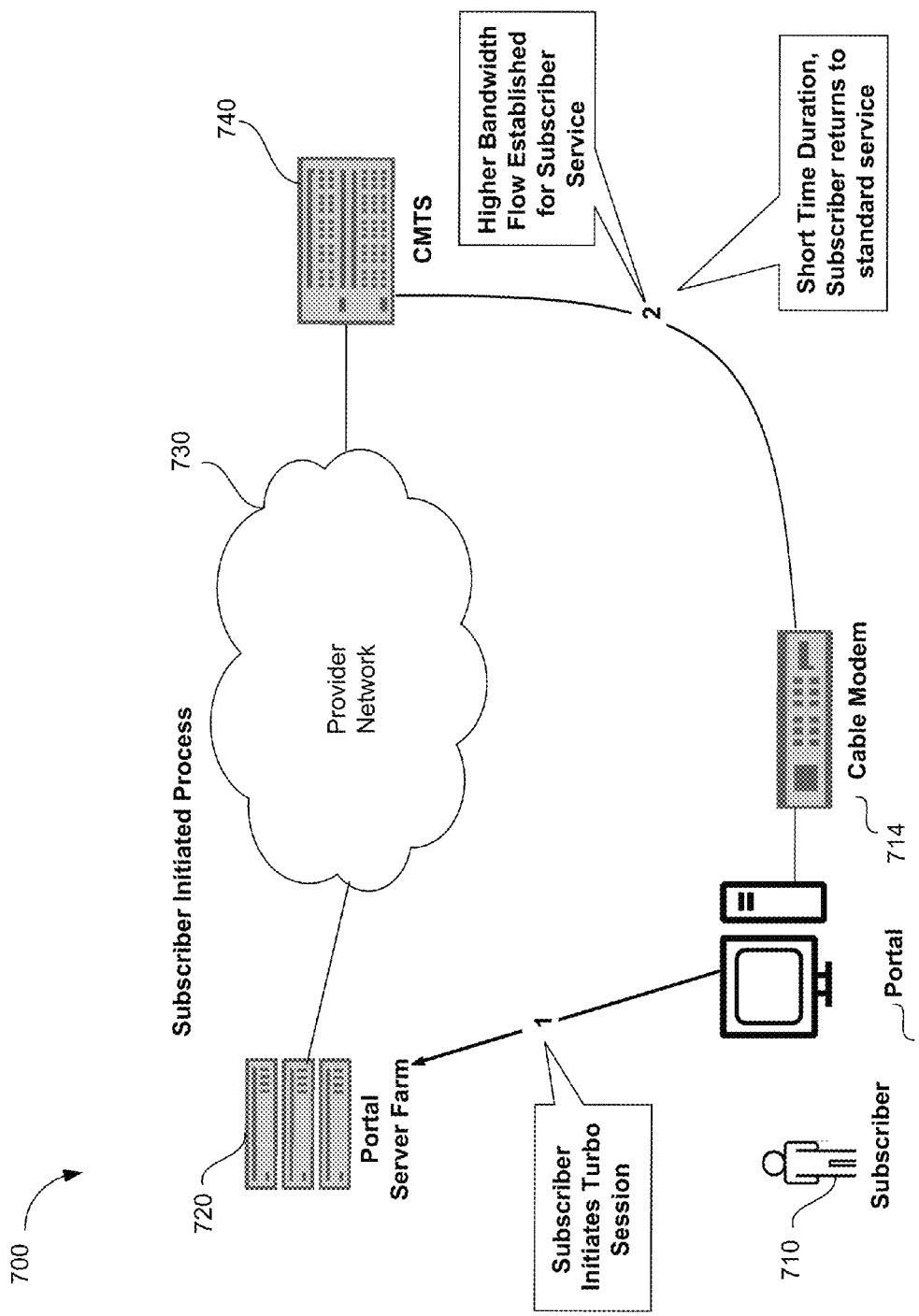
FIG. 7 is illustrates a subscriber initiated bandwidth increase according to an embodiment of the invention.

FIGS. 7-12 show block diagrams illustrating embodiments for increasing the bandwidth for a subscriber. FIG. 7 is illustrates a subscriber initiated bandwidth increase 700 according to an embodiment of the invention. A subscriber may initiate a bandwidth increase, which may be associated with an upstream or a downstream direction. For example, a Turbo Button may be presented to the subscriber to initiate the increase in bandwidth. However, those skilled in the art will recognize that the invention is not meant to be limited to a Turbo Button. Rather, the temporary provisioning of a bandwidth increase may be initiated with a variety of means, e.g., a touch screen on a remote control device, a voice command, entering a code, etc.

In FIG. 7, a subscriber 710 is located at a portal 712. Portal 712 is coupled to a cable modem or other access control device 714. The subscriber 710 initiates an increased bandwidth session, e.g., a turbo session. The command or request for the increased bandwidth is provided to a portal server farm 720, which communicates with CMTS 740 via the provider network 730. The CMTS establishes a higher bandwidth flow for the subscriber. After a short duration, the CMTS may return the subscriber back to the standard service.

Thus, the temporary bandwidth increase may be provided for a short duration, e.g., less than 10-20 minutes. A limit may also be imposed to control the number of times a subscriber can initiate a bandwidth increase within a time period. The subscriber initiated bandwidth increase may also be applied to business accounts. Further, the subscriber initiated bandwidth may be implemented so that it is available to premium subscribers, or all subscribers. In addition, different service tiers may be configured to offer a different number of available activations.

Figure 8:
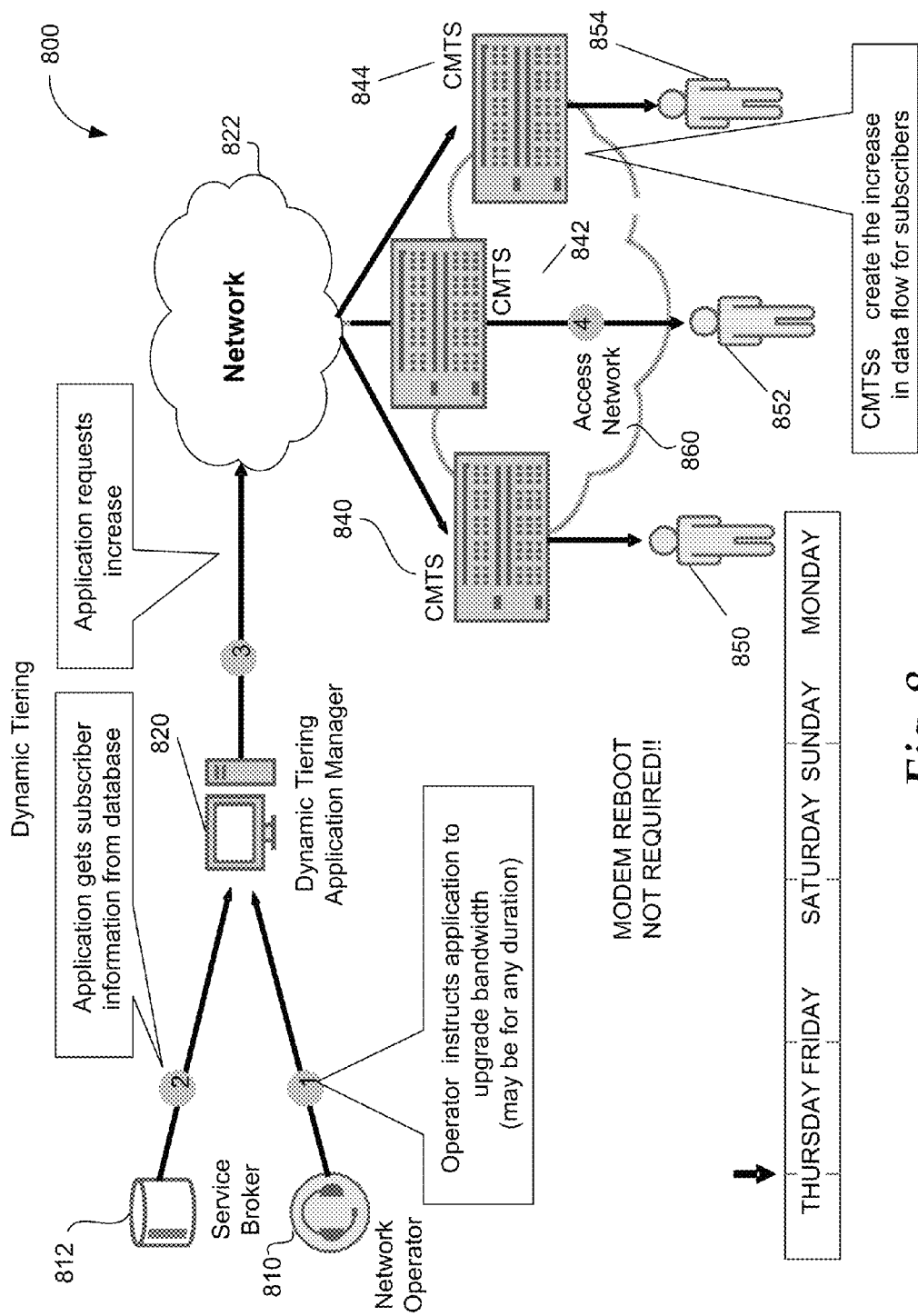
FIG. 8 is illustrates an operator initiated bandwidth increase according to an embodiment of the invention.

FIG. 8 is illustrates an operator initiated bandwidth increase 800 according to an embodiment of the invention. In FIG. 8, a network operator 810 may initiate a bandwidth increase by instructing a dynamic tiering application manager 820 to upgrade the bandwidth. This increase in bandwidth may be set for a predetermined duration by the operator 810. Dynamic tiering application manager 820 obtains subscriber information from database 812. The dynamic tiering application manager 820 communicates with CMTS 840-844 through network 822 to request an increase in bandwidth. CMTS 840-844 are coupled to subscribers 850-854 through access network 860. CMTS 840-844 create the increase in data flow for subscribers 850-854. A modem reboot is not required.

Thus, for an operator initiated bandwidth boost, no subscriber action is required and the increase in bandwidth may be for an upstream or downstream session. Therefore, subscribers may not be actively aware of the increased bandwidth. The operator initiated increase in bandwidth may be offered to all subscribers as an upsell opportunity. The operator may obtain statistics based on which subscribers used the most bandwidth during the promotion of the temporary bandwidth increase. Various means may be used to notify subscribers of the promotion. For example, an email notification of the promotion may be sent to subscribers to make them aware of the change.

Figure 9:
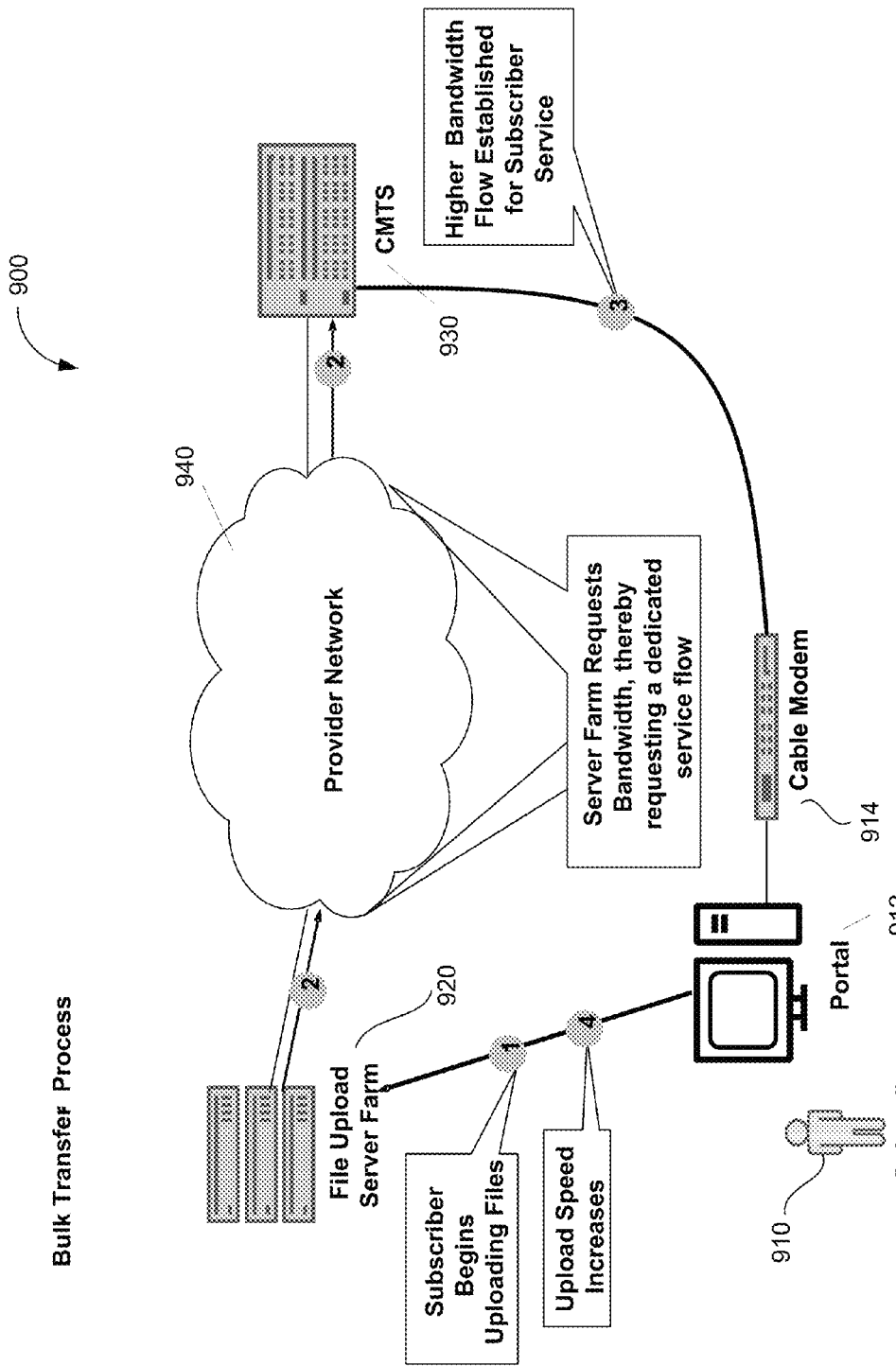
FIG. 9 is illustrates a bulk transfer using a bandwidth increase according to an embodiment of the invention.

FIG. 9 is illustrates a bulk transfer using a bandwidth increase 900 according to an embodiment of the invention. In FIG. 9, a subscriber 910 is at portal 912. Portal 912 is coupled to a cable modem or other access control device 914. The subscriber 910 may begin uploading files to a file upload server farm 920. The server farm 920 communicates with CMTS 930 through provider network 940 to request an increase in bandwidth, e.g., a dedicated service flow. CMTS 930 establishes a higher bandwidth flow for the subscriber 910.

Thus, the subscriber 910 may be provided an increase in bandwidth to upload or download of large files for the purpose of photo storage (i.e., snapfish, ofoto), online backup, web site maintenance, software download, etc. The bandwidth may be dynamically adjusted by the provider. Thus, no subscriber action is required. The increase in bandwidth may be triggered automatically off a specific web page or application.

Figure 10:
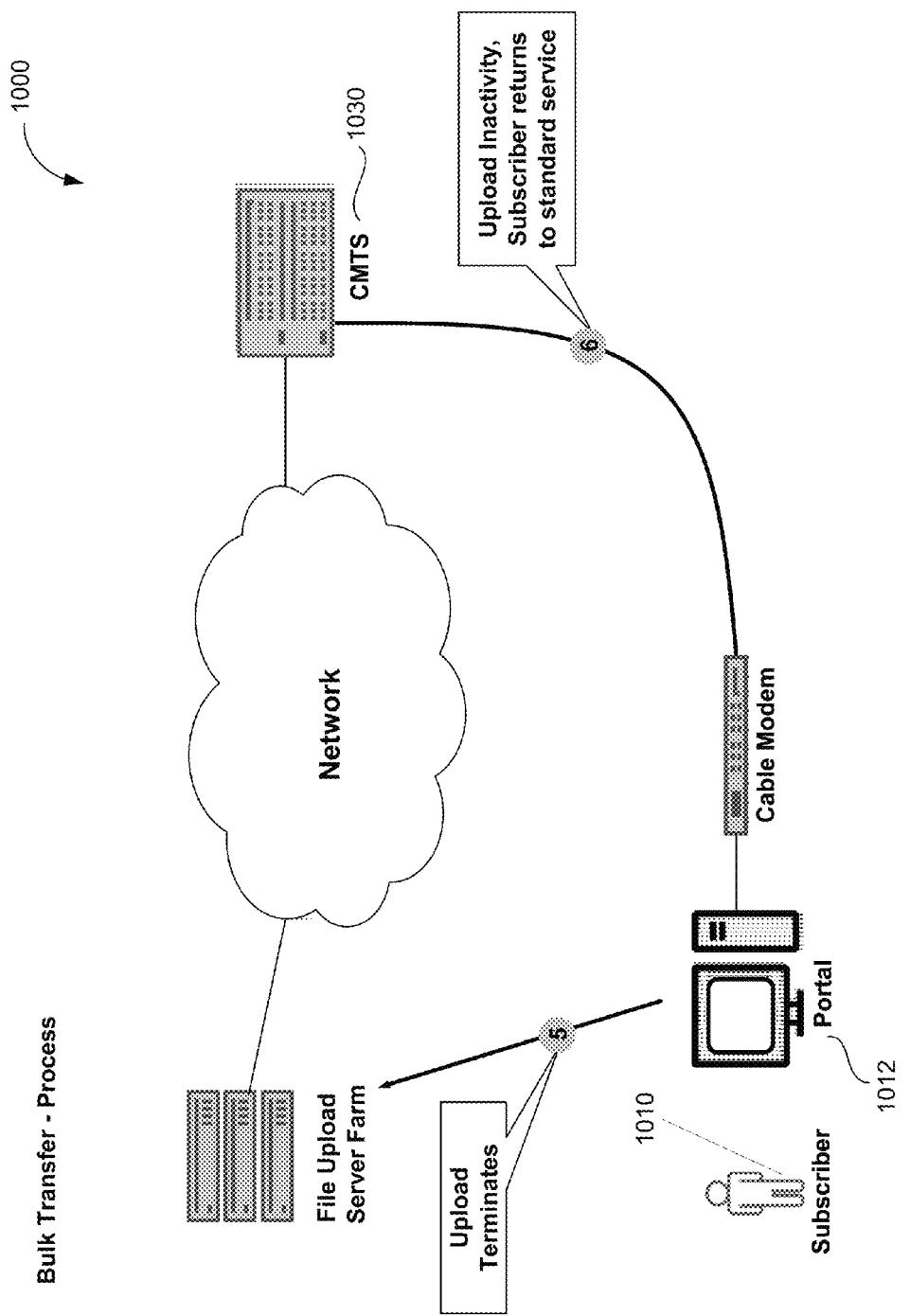
FIG. 10 illustrates termination of the bulk transfer according to an embodiment of the invention.

FIG. 10 illustrates termination of the bulk transfer 1000 according to an embodiment of the invention. In FIG. 10, the upload of files form the portal 1012 of the subscriber 1010 terminates. After a period of inactivity, CMTS 1030 returns the subscriber 1010 to standard service.

Figure 11:
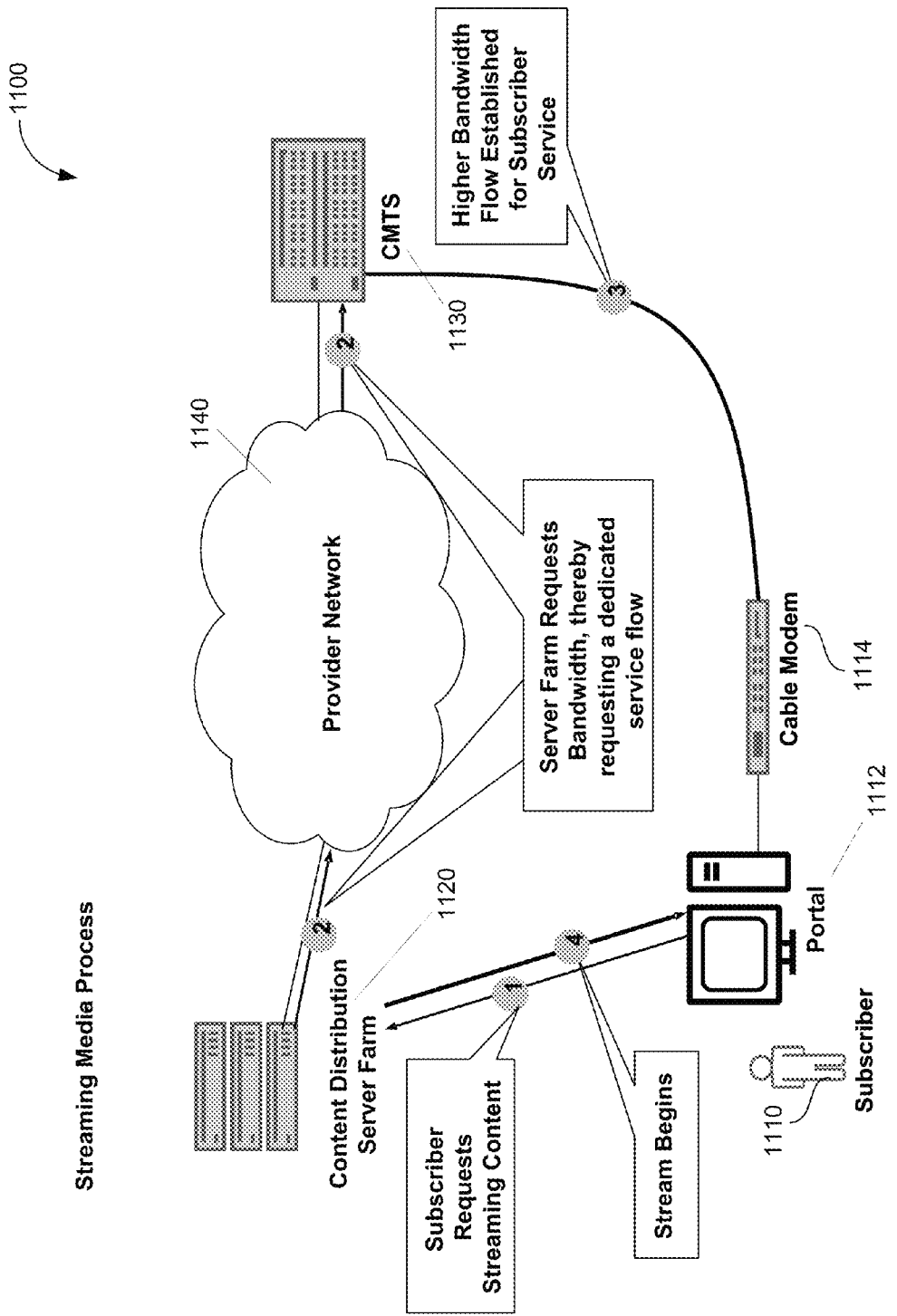
FIG. 11 is illustrates streaming of media using a bandwidth increase according to an embodiment of the invention.

FIG. 11 is illustrates streaming of media using a bandwidth increase 1100 according to an embodiment of the invention. In FIG. 11, a subscriber 1110 is at portal 1112. Portal 1112 is coupled to a cable modem or other access control device 1114. The subscriber 1110 may request streaming content for content distribution server farm 1120. The server farm 1120 communicates with CMTS 1130 through provider network 1140 to request an increase in bandwidth for the streaming of the media content to the subscriber. CMTS 1130 establishes a higher bandwidth flow for the subscriber 1110 and the streaming of the media content to the subscriber 1110 may begin using the increased bandwidth.

Thus, a temporary increase in bandwidth may be used to deliver higher quality audio/video content at guaranteed service levels to subscribers. This service may be offered exclusively to premium subscribers as an added value. For businesses, the capability to dynamically increase bandwidth of a subscriber may result in more traffic from subscribers to a portal. This also allows service providers, such as cable operators, to partner with content providers to enable a premium subscriber experience through the temporary increase in bandwidth.

Figure 12:
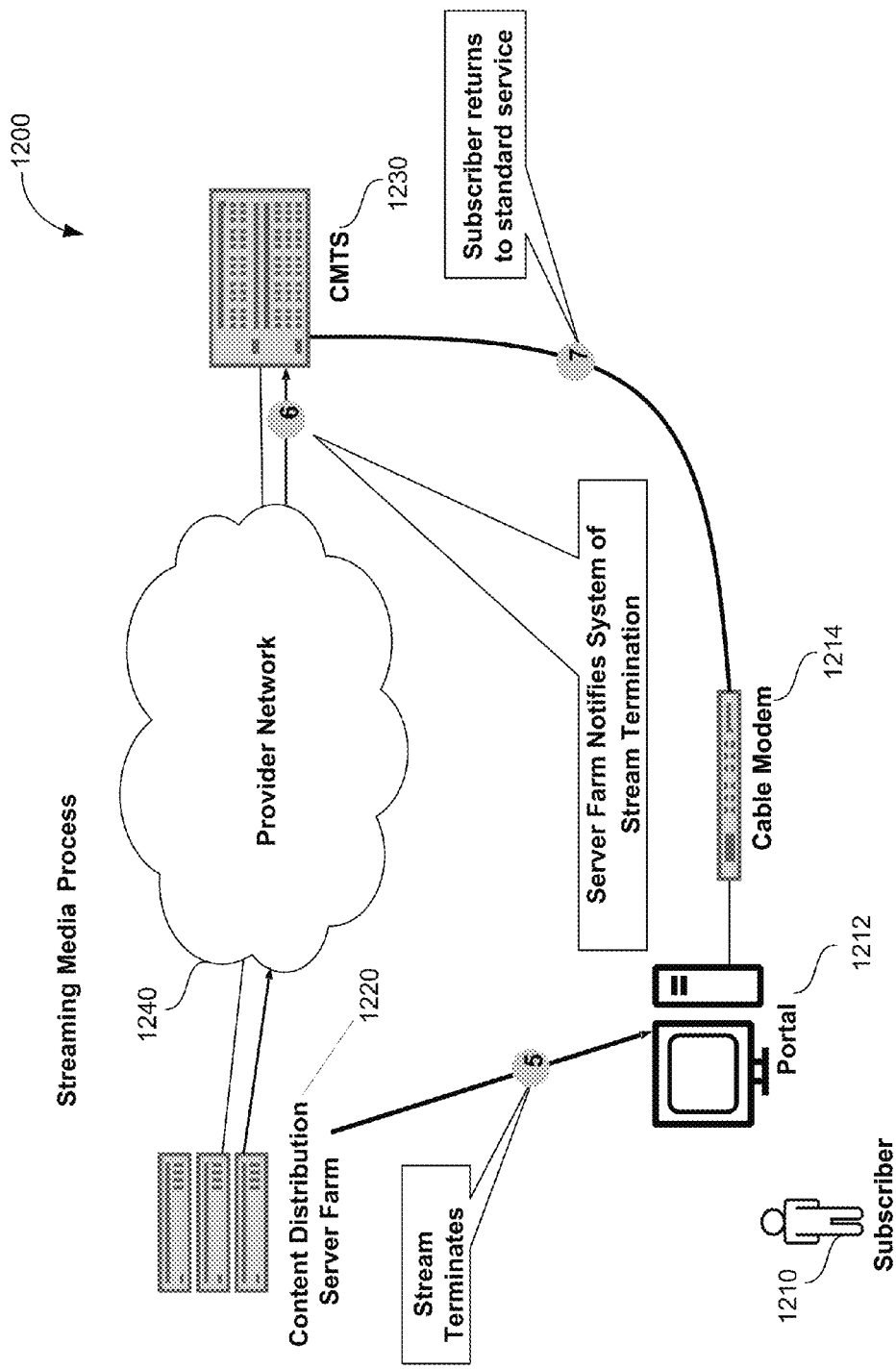
FIG. 12 illustrates termination of the increased bandwidth for the streaming of media content according to an embodiment of the invention.

FIG. 12 illustrates termination of the increased bandwidth for the streaming of media content 1200 according to an embodiment of the invention. In FIG. 12, the stream of the media content to the portal 1212 of the subscriber 1210 terminates. The server farm 1220 communicates to CMTS 1230 through provider network 1240 that the streaming of the media content has completed. CMTS 1230 returns the subscriber 1210 to standard service.

Figure 13:
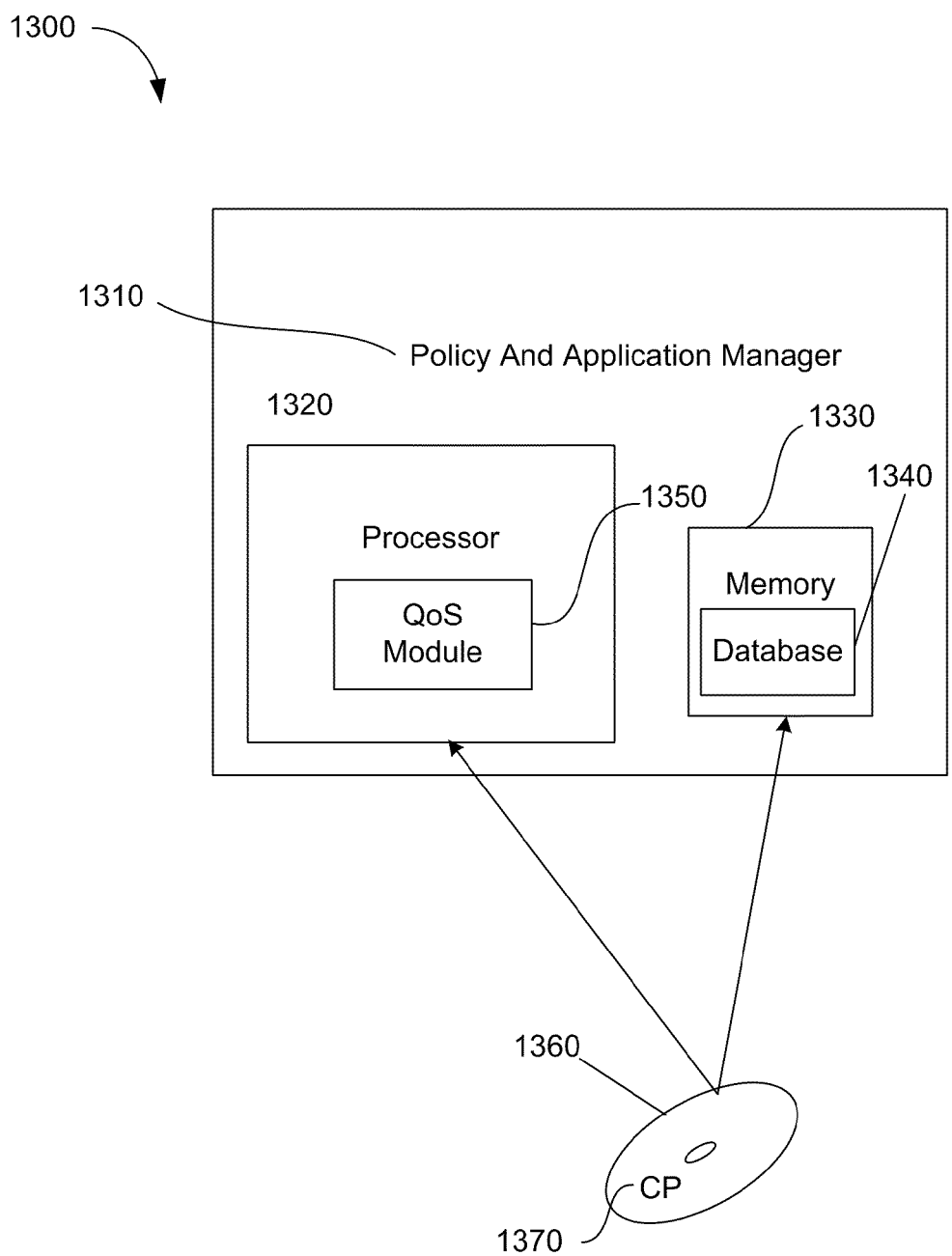
FIG. 13 illustrates a suitable computing environment for implementing a system as described above in FIGS. 1-12 according to one embodiment.

FIG. 13 illustrates a suitable computing environment 1300 for implementing a system as described above in FIGS. 1-12 according to one embodiment. In FIG. 13, a policy and application manager 1310 includes a processor 1320 implementing a quality of service (QoS) Module 1350 and memory 1330 including a Database 1340. Embodiments may also be implemented in combination with other types of computer systems and program modules. Generally, program modules include routines, programs, components, data structures, and other types of structures that perform particular tasks or implement particular abstract data types. By way of example, computer readable media 1360 can include computer storage media or other tangible media. Computer storage media 1360 includes volatile and nonvolatile, removable and non-removable media implemented in any method or technology for storage of information 1370, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 1360 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 1370 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 1320 may be configured to execute instructions that perform the operations of embodiments of the present invention. Memory 1330 thus may store the computer-executable instructions that, when executed by processor 1320, cause the processor 1320 to implement a system as illustrated above in FIGS. 1-12.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A policy manager, comprising:
memory for storing data; and
a processor, coupled to the memory, the processor configured to implement a single token bucket for a given subscriber having parameters for controlling the amount of data injected into a network, the parameters including a dynamic aperture establishing a rate cap that sets a maximum rate at which tokens are removed from the single token bucket, the processor receiving and processing packet cable multimedia commands to dynamically configure the parameters of the single token bucket to provide a temporary bandwidth increase, the temporary bandwidth increase provided by preloading the single token bucket to capacity.

2. The policy manager of claim 1, wherein the single token bucket is implemented on a per service flow basis.

3. The policy manager of claim 1, further comprising a second token bucket configured to control an individual flow burst rate up until the single token bucket is depleted.

4. The policy manager of claim 1, wherein the parameters of the single token bucket include a size of a token and a size of the token bucket identifying a capacity for holding tokens, wherein the token bucket controls an initial burst related to an individual flow.

5. The policy manager of claim 1, wherein the processor enlarges the size of the single token bucket in response to the received packet cable multimedia command.

6. The policy manager of claim 1, wherein the processor enlarges the dynamic aperture for allowing tokens to be released from the single token bucket in response to the received packet cable multimedia command.

7. The policy manager of claim 1, wherein the packet cable multimedia command comprises a configuration file for storing in the memory, the processor accessing the configuration file to implement the single token bucket in accordance with parameters provided in the configuration file.

8. The policy manager of claim 1, wherein the packet cable multimedia command is generated automatically based on the processor detecting a predetermined trigger.

9. The policy manager of claim 1, wherein the packet cable multimedia command is initiated by a subscriber.

10. The policy manager of claim 1, wherein the packet cable multimedia command is initiated by a service provider on behalf of a subscriber.

11. The policy manager of claim 1, wherein the packet cable multimedia command is initiated by a third party and authenticated by the processor.

12. The policy manager of claim 1, wherein the processor returns the subscriber to a provisioned rate cap when the single token bucket is exhausted.

13. The policy manager of claim 1, wherein the processor imposes a limit to control the number of times the subscriber can initiate a bandwidth increase within a predetermined time period.

14. The policy manager of claim 1, wherein the processor provides the temporary bandwidth increase for a gaming application.

15. The policy manager of claim 1, wherein the processor provides the temporary bandwidth increase for a file upload application.

16. The policy manager of claim 1, wherein the processor provides the temporary bandwidth increase for a media streaming application.

17. A network for providing a dynamic bandwidth increase using a token bucket, comprising:
a policy manager configured for storing data and for implementing a single token bucket for a given user having parameters for controlling the amount of data injected into a network, the parameters including a dynamic aperture establishing a rate cap that sets a maximum rate at which tokens are removed from the single token bucket, the policy manager including a processor for receiving and processing packet cable multimedia commands to dynamically configure the parameters of the single token bucket to provide a temporary bandwidth increase, the policy manager generating a bandwidth setting command requesting the temporary bandwidth increase by preloading the single token bucket to capacity; and
a cable modem termination system, coupled to the policy manager, for receiving the bandwidth setting command from the policy manager, the cable modem termination system establishing an increased bandwidth for a subscriber based on the receipt of the bandwidth setting command from the policy manager.

18. A method for providing a dynamic bandwidth increase using a token bucket, comprising:
storing a configuration data file;
receiving and processing a packet cable multimedia command for modifying the configuration data file;
dynamically configuring parameters of a token bucket for a given user to provide a temporary bandwidth increase based on the packet cable multimedia command, the parameters of the token bucket including a dynamic aperture establishing a rate cap that sets a maximum rate at which tokens are removed from the token bucket; and preloading the token bucket to capacity in response to the dynamically configuring the parameters of the token bucket.

19. The method of claim 18, wherein the dynamically configuring parameters of the token bucket further comprises implementing the token bucket on a per service flow basis.

20. The method of claim 18, wherein the dynamically configuring parameters the token bucket further comprises dynamically configuring parameters of a plurality of token buckets, a first of the plurality of token buckets being configured to control a total burst size and at least a second of the plurality of token buckets being configured to control an individual flow burst rate up until the first token bucket is depleted.

21. The method of claim 18, wherein the dynamically configuring parameters of the token bucket comprises configuring a size of the token bucket for identifying a capacity for holding tokens.

22. The method of claim 21, wherein the dynamically configuring parameters of the token bucket comprises enlarging the size of the token bucket in response to the received packet cable multimedia command, wherein the token bucket controls an initial burst related to an individual flow.

23. The method of claim 21, wherein the dynamically configuring parameters of the token bucket comprises enlarging the dynamic aperture for allowing tokens to be released from the token bucket in response to the received packet cable multimedia command.

24. A system for providing a dynamic bandwidth increase using a token bucket, comprising:
a processor;
a computer-readable medium having stored thereon computer-executable instructions, which when executed by the processor cause the system to provide:
a single token bucket operable to control a bandwidth available to a given user by permitting a transmission of a packet over a network when the single token bucket contains a number of tokens corresponding to a size of the packet, wherein tokens are added to the single token bucket at a constant rate and the number of tokens are removed from the single token bucket when the packet is transmitted, wherein the single token bucket includes a size defining a maximum number of tokens that the single token bucket is operable to contain and a dynamic aperture that limits a rate at which the tokens are removed from the single token bucket to permit the transmission of the packet, wherein the single token bucket controls the available bandwidth by prefilling the single token bucket with the maximum number of tokens and increasing the dynamic aperture to permit the maximum number of tokens to be removed from the single token bucket, and by decreasing the dynamic aperture to prevent the maximum number of tokens from being removed during a given time period from the single token bucket as the single toke bucket fills at the constant rate.

* * * * *